United States Patent [19]
Heigl et al.

[11] 3,740,156
[45] June 19, 1973

[54] PHOTOMETRIC ANALYZER SAMPLING CELL

[75] Inventors: John J. Heigl, Short Hills; Oliver G. Lewis, Westfield, both of N.J.

[73] Assignee: Esso Research and Engineering Company, Linden, N.J.

[22] Filed: Aug. 11, 1971

[21] Appl. No.: 170,696

[52] U.S. Cl. .................. 356/204, 250/218, 356/246
[51] Int. Cl. ............................................. G01n 1/20
[58] Field of Search .................... 356/95, 181, 183, 356/201, 204, 244, 246; 250/218

[56] References Cited
UNITED STATES PATENTS

| | | | |
|---|---|---|---|
| 2,436,511 | 2/1948 | Flatford et al. ..................... | 356/246 |
| 2,690,695 | 10/1954 | Coates .............................. | 356/246 |
| 2,819,402 | 1/1958 | Watson et al. ................. | 356/246 X |
| 3,257,562 | 6/1966 | Erdman et al. ...................... | 356/95 |
| 2,649,011 | 8/1953 | Black ................................. | 356/246 |
| 3,391,598 | 7/1968 | Grave, Jr. et al. .................. | 356/246 |

FOREIGN PATENTS OR APPLICATIONS

| | | | |
|---|---|---|---|
| 1,498,708 | 2/1969 | Germany ........................... | 356/181 |

*Primary Examiner*—Ronald L. Wibert
*Assistant Examiner*—F. L. Evans
*Attorney*—Leon Chasan, Donald F. Wohlers, F. Donald Paris

[57] ABSTRACT

A movable window which coacts with a fixed window in an on-stream photometric analyzer for trapping a sample of flowing fluid for analysis without interrupting the flow of the main stream. The two windows comprise a sample cell when in close proximity to one another. After the analysis, the movable window is retracted so that the sample is released and residues purged by the main stream before the process is repeated.

8 Claims, 5 Drawing Figures

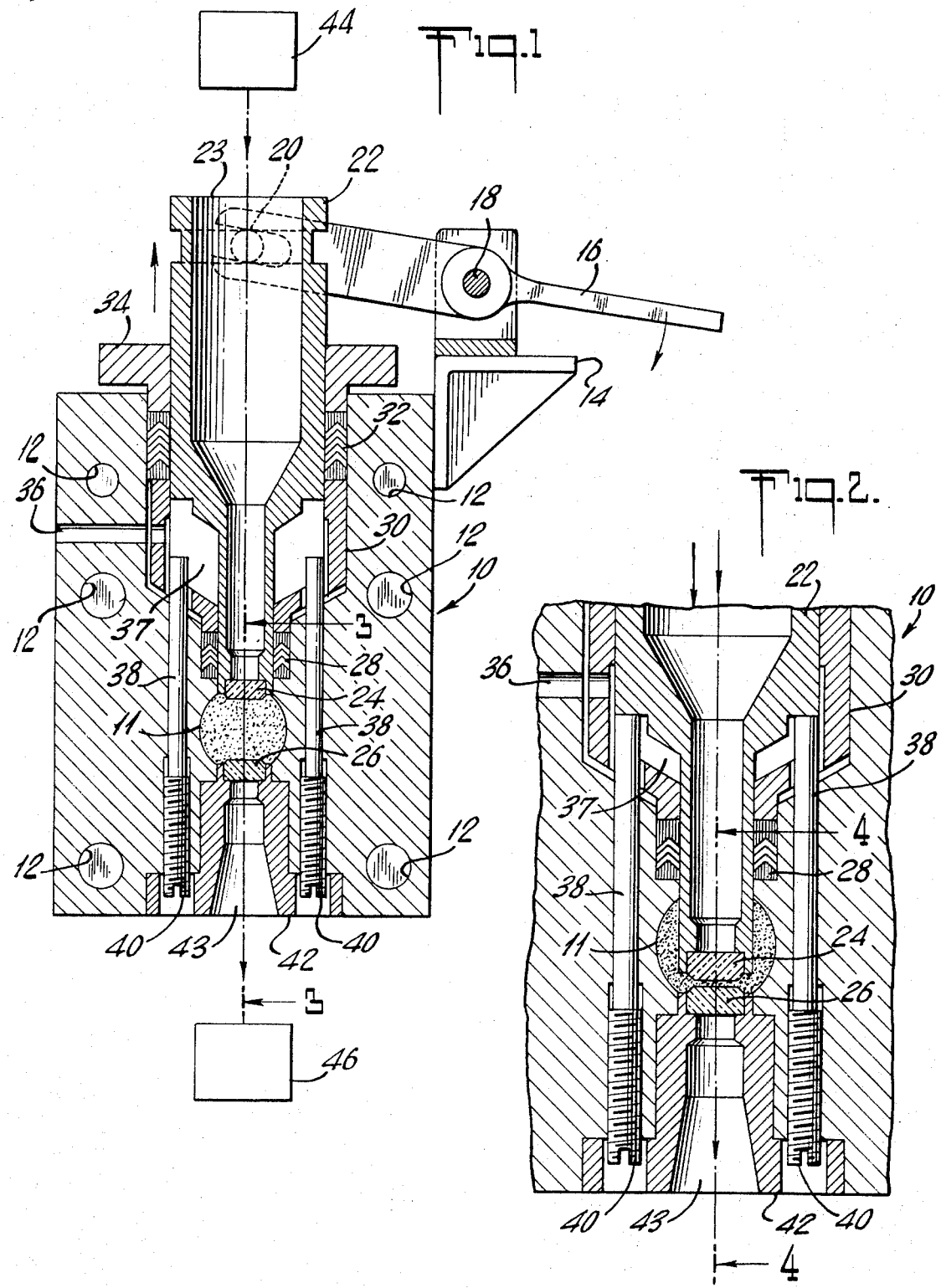

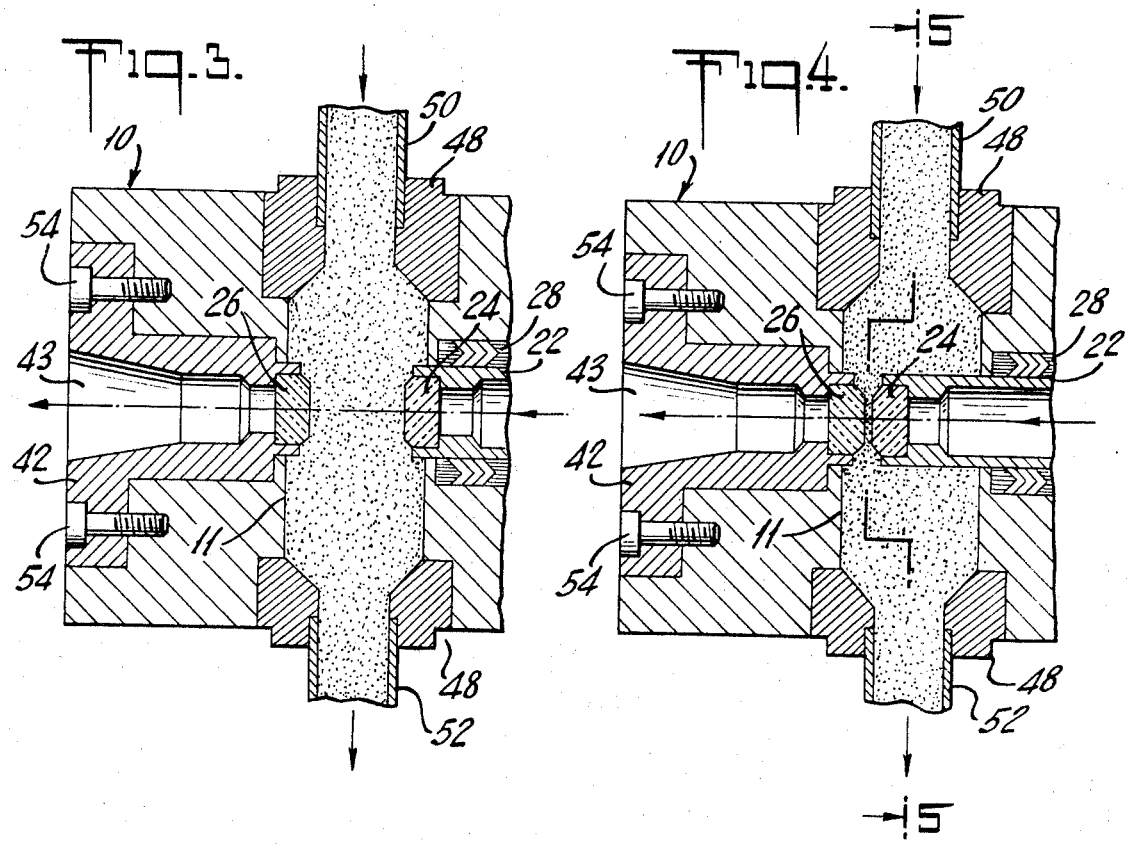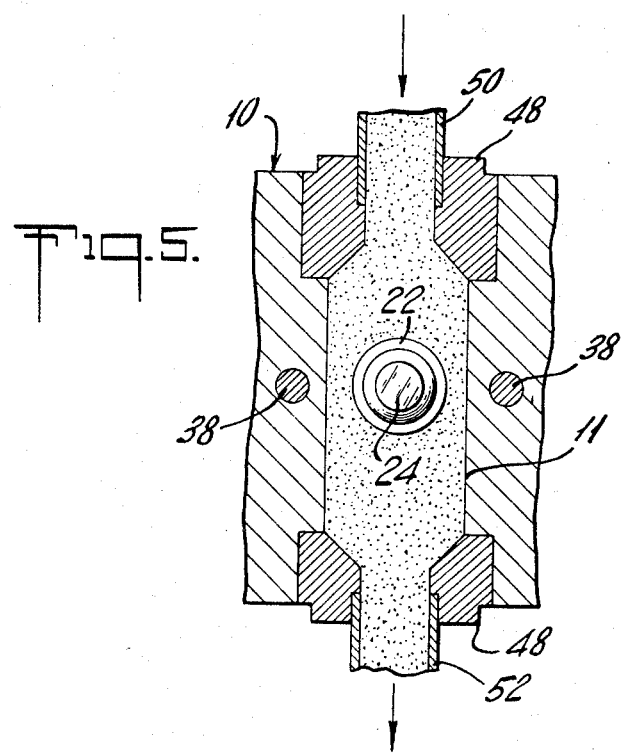

PHOTOMETRIC ANALYZER SAMPLING CELL

BACKGROUND OF THE INVENTION

It is common in the chemical and related arts to make measurements with analyzers which utilize the optical properties of the materials being analyzed. Such analyzers may utilize color, turbidity, haze, light absorption or other properties in order to determine the quality of the fluid being tested. Such measurements may be made in the laboratory or directly on continuously flowing streams such as may be found in plant-scale operations. Typically, samples are taken from processes which are being investigated and then, after placing the samples into sample cells designed for use within an analyzer instrument, the cells are introduced into the instrument and comparisons are made with known standards. Such an analytical procedure is both cumbersome and time consuming. Sampling complexities may make the results of doubtful accuracy and repeatability. In order to avoid such problems, it is desirable to make measurements directly on the process with the analyzer being located in the field rather than in the laboratory.

An example of an analytical sampling device which is utilized in connection with continuously flowing streams is disclosed in the U.S. Pat. No. 3,518,011 to Rochte. The flow cell which is the subject of the patent contains a passageway operably connected to the pipe or tubing in which the stream is flowing. By diverting the cell passageway to a position where it acts as a sample holder, measurements can be made by an analyzer. Such a technique minimizes many of the problems inherent in the use of field sampling and laboratory measurements. The patented flow cell has disadvantages in that only a fixed volume of material is extracted at any given time and there is a momentary interruption of flow as the cell's passageway is isolated from the main flow. It is likely that such a device would be unsatisfactory with relatively viscous materials which might be difficult to purge from the device after being trapped therein.

Another prior art device which is intended for laboratory use rather than field use is disclosed in U.S. Pat. No. 2,490,345 to Flatford et al., which includes a telescoping cell to adjust the amount of sample trapped between the faces thereof and thus avoid the need to dilute the sample to suit the capability of the analyzer. This cell is intended primarily for use where a gas or liquid having a high volatility is being sampled and which can be readily disposed of by reducing pressure after the measurement has been made. It is not essentially an on-stream analyzer nor is it adapted for use with a relatively viscous material.

When dealing with highly viscous materials, such as liquid or molten plastics, the difficulties previously mentioned in connection with laboratory measurements make it highly desirable to perform optical analysis directly on the stream flowing within the process to be studied. When dealing with such materials, the film thickness which is used in order to make the desired measurements may vary from a few thousandths of an inch to a few tenths of an inch. In any case, the sample needed is relatively small and relatively thin. It is obvious that placing a viscous material between the faces of a sample cell as close together as is necessary for this purpose would be very difficult. Obtaining a proper sample and the positioning of the sample would make the reproducibility of such results of doubtful validity. Such difficulties would suggest the addition of a diluting fluid to the sample. Inherently this would involve using laboratory equipment operating on samples taken from the flowing stream. The obtaining of measurements directly from the flowing stream without dilution also presents problems. Only a thin sample is wanted but if the fluid plastic were forced through a very narrow opening within the flowing passageway undesirably high pressure drops and turbulence would result which could upset the accuracy of the measurement.

The present invention overcomes such difficulties and permits the use of on-line analysis of a continuously flowing plastic or other viscous stream. It does not interrupt or impede the flow of said stream thereby assuring a minimal effect on the process itself. It inherently has the ability to clean and purge the sample cell in order to insure that a proper new sample is obtained at each measurement.

SUMMARY OF THE INVENTION

A sample cell assembled directly within a process stream comprises two windows, one of which is movable relative to the other. When analysis is not required, the movable window is retracted to allow unobstructed flow of fluid through the cell. When optical analysis is desired, the movable window is moved into the flowing stream toward the fixed window, stopping at a predetermined spacing therefrom and thereby trapping a sample between the two windows. Sufficient space is provided around the movable window and its associated mechanism to permit continued flow of the fluid but without creating excessive pressure drop in the flowing fluid. The rate of introduction or retraction of the movable window is controlled to provide a minimum of upset to the pressure within the system. In instances where film thickness or optical path length is critical, the controls are compensated for temperature changes within the housing in order to insure accuracy. The movable window may be manually or automatically introduced into the process stream by cams, levers or lead screws and the like and driven by pneumatic, hydraulic, or electrical means. Retraction of the window may be accomplished in a similar manner or, alternatively, should the internal pressure be high enough, it may be used to retract the window.

BRIEF DESCRIPTION OF THE DRAWINGS

FIG. 1 shows a section of the analyzer cell according to the present invention illustrating the overall arrangement of said cell with the movable window in a fully retracted position.

FIG. 2 shows an enlarged portion of FIG. 1 with the movable window in the fully extended position for use when making optical measurements.

FIG. 3 shows an enlarged sectional view of the analyzer cell taken substantially along the line 3—3 of FIG. 1 with the movable window in the fully retracted position.

FIG. 4 is an enlarged sectional view taken substantially on the line 4—4 of FIG. 2 with the movable window in the fully extended position.

FIG. 5 is a sectional view taken substantially along the line 5—5 of FIG. 4 showing an end view of the movable window in its fully extended position.

DESCRIPTION OF THE PREFERRED EMBODIMENT

FIG. 1 shows a sectional view through the central axis of an analyzer cell according to the present invention illustrating all of the major parts and the relationship therebetween. The analyzer cell is connected to piping or tubing in which is flowing a fluid, particularly liquid or molten plastic which is to be analyzed for its optical properties. The analyzer cell comprises a main body 10 in which are located standard electrical heaters passing through the openings 12. The heaters are required in order to maintain the fluid condition of the plastic material and thus avoiding freezing of the analyzer cell when by heat losses flow stops or is retarded. Bracket 14 suitably is mounted on the cell body 10 by welding or the like and carries a lever arm 16 pivotally mounted at 18 for movement of a plunger 22. The lever arm 16 has a bifurcated end permitting it to ride on pin 20 secured to the plunger 22 and thereby move plunger 22 in a reciprocating fashion perpendicular to the direction of fluid flow. Plunger 22 is movably mounted within the cell body 10 and contains at one extremity a window 24 located on the same axis as a fixed window 26. These windows are usually made of quartz or saphire and are transparent to the "light" which is passed through the sample of molten plastic trapped between them. Plunger 22 must be sealed against the flow of molten plastic which would otherwise pass between the plunger and the cell body 10. The sealing is accomplished by two sets of packing rings comprising an inner packing 28 immediately adjacent to the movable window 24 and an outer packing 32 located next to a gland 34 used to tighten the packing rings. Between the two sets of packing rings is a bushing 30. A vent 36 passing through bushing 30 and body 10 is provided to avoid alternating cycles of pressure and vacuum into space 37 as plunger 22 moves in and out.

In FIG. 1 plunger 22 is shown fully retracted so that it provides the least hindrance to the flow passing through passageway 11. When plunger 22 is moved inward toward the fixed window 26 (see FIG. 2), the extent of its inward movement is limited by steps or abutments 38 which are positioned by adjustment screws 40 and abut against aligned surfaces of the plunger. Fixed window 26 is mounted opposite movable window 24, the two having their surfaces disposed in parallel planes in order to assure the accuracy of the optical transmission of radiation. Fixed window 26 is mounted on an insert 42 which is held in place by cap screws or other suitable mounting means (not shown). As in the case of the movable window 24, the fixed window 26 permits the radiation to be transmitted and the mounting insert 42 contains a passageway for radiation to pass out of the analyzer cells to the receiving source.

In operation, the analyzer cells serve as a window for radiation passing from the conventional source shown schematically at 44, through the inlet passageway 23 in plunger 22 to movable window 24, through the molten plastic or the like trapped between the windows in passageway 11, then through fixed window 26 and the outlet passageway 43 contained in mounting insert 42 to a conventional receiver schematically shown at 46.

In FIG. 2 is shown an enlarged portion of FIG. 1 with the plunger 22 extending into the passageway 11 in order to trap a sample between the movable window 24 and the fixed window 26. It will be noted that plunger 22 is now limited in its movement by stops 38 abutting against corresponding surfaces on the plunger 22. It can be seen in this view that the end of plunger 22 and the movable window 24 positioned at its end are of such a size that they do not materially influence the flow of fluid passing through the passageway. Sufficient area is provided on either side of the window carrying end of the plunger 22 to assure that flow may be relatively unimpeded and a minimum of interference will occur with the normal operation of upstream and downstream equipment. It should be noted that it is important in introducing the plunger 22 to avoid doing so at such a rate that a significant pressure buildup would occur upstream of the plunger 22. Therefore, the rate of introduction of the plunger may be adjusted automatically to avoid such a condition. The relatively viscous molten plastic material will be trapped between the movable window 24 and the fixed window 26 which have a relatively close spacing, usually between a few thousandths of an inch to a few tenths of an inch. Due to the viscous nature of the fluid, once a sample is trapped there will be essentially no movement of fluid between the window faces and, in effect, the two faces will form an optical cell with only two sides, the plastic flowing as previously mentioned around the entrapped fluid.

In FIG. 3 the same parts as were shown in FIGS. 1 and 2 are again visible for the most part with the exception of the cap screws 54 used to hold the mounting insert 42. The attached piping 50 is shown in FIG. 3 connected by means of a connector 48 which is adapted to receive the tubing or piping and secure it to the analyzer cell body 10. The outlet piping 52 also is connected by a similar connector 48 to cell body 10. In the view of FIG. 3 the flow of molten plastic is assumed to be from top to bottom and passageway 11 is more clearly seen as being somewhat enlarged from that of the tubing 50 and 52 which are handling the normal flow of fluid. This is desirable in order that when the plunger 22 descends there will still be space sufficient for flow around the sides of the plunger.

In FIG. 4, the same enlarged portion of FIG. 3 is shown with the exception that plunger 22 has now been moved to its fully extended position whereby a sample of molten plastic is trapped between the movable window 24 and the fixed window 26. Due to the viscous nature of the fluid a sample will be trapped between the two faces of the windows previously mentioned thereby acting as an optical cell without sides, retaining the sample by means of the high viscosity of this particular material. It is clear that this particular technique is uniquely adapted to highly viscous materials. It would, however, be possible in the event that liquids having low viscosity were being sampled that the movable and fixed window could be adapted into a cell having sides which traps a sample of material for measurement. After the measurement, the sample could be removed by separating the portions of the cell again.

When the plunger 22 is retracted the flow of molten plastic will necessarily purge and effectively clear the material which has been held in position on the faces of the quartz windows, thereby preparing them to receive another fresh sample.

FIG. 5 is a view taken substantially along line 5—5 of FIG. 4 in which is shown the plunger 22 and the window 24 positioned at the end thereof. It can be seen here that the flow area on either side of the plunger 22 is sufficient to provide essentially the same cross-sectional area as that availed by inlet and outlet tubing 50 and 52.

The specific embodiment as illustrated herein is particularly well adapted to measurements made on highly viscous materials such as liquid or molten plastic. As previously mentioned, other materials could be used which might require the adaptation of the effective cell created between the two quartz windows but which would not be outside the scope of the invention as herein disclosed. The invention itself is set forth more fully in the claims below.

What is claimed is:

1. A method of on-stream measurement of a continuously flowing viscous fluid stream comprising:
    a. trapping a sample of said viscous fluid between relatively movable radiation transparent parallel surfaces mounted within said flowing stream and parallel to the direction of flow by moving said surfaces into predetermined relative close promixity and thereby creating an optical cell without sides;
    b. passing radiation through said sample;
    c. receiving said radiation in a detector means and comparing the received radiation with radiation passed through a known standard; then
    d. releasing said sample from between said transparent surfaces into said flowing stream by retracting at least one of said surfaces from the position of close proximity established in step (a).

2. The method of claim 1 wherein said radiation transparent surfaces are positioned in predetermined close proximity with compensation for the effect of temperature or spacing.

3. An analyzer cell for on-stream measurements of a continuously flowing viscous fluid stream comprising:
    a. a body member adapted to be operably connected to conduits carrying said flowing stream and having:
        1 a first passageway for carrying said flowing stream through said body member;
        2. a second passageway smaller in cross-section than said first passageway for transmitting radiation through said body member and intersecting said first passageway whereby radiation may be passed through a sample of flowing stream;
    b. a hollow plunger slidably mounted within said second passageway and having mounted thereon at one end and disposed adjacent to said first passageway a first window transparent to the radiation to be transmitted, said window being disposed at one side of said first passageway when retracted and parallel to the direction of flow through said passageway;
    c. a hollow mounting insert having a second window transparent to the radiation to be transmitted and disposed within said second passageway on the opposite side of said first passageway from said first window and parallel to said first window, said second window projecting into said first passageway; and
    d. means for moving said plunger and positioning it such that said first window can be located in predetermined close proximity to said second window for confining a sample of said flowing fluid between said windows for analysis by radiation and permitting the remainder of said stream to flow through the unoccupied area of said first passageway.

4. The analyzer cell of claim 3 wherein said positioning means for said plunger includes compensation for temperature to provide for accurate positioning of said first window relative to said second window.

5. The analyzer cell of claim 3 including adjustable abutments to determine the position of said first window to said second window.

6. The analyzer cell of claim 3 having more than one set of packing rings for sealing said plunger within said second passageway whereby leakage is prevented and provided with vent means located between said sets of rings.

7. The analyzer cell of claim 3 wherein said positioning means for said plunger limits the speed of movement of said plunger below that at which excessive pressure build-up would occur upstream of the analyzer cell.

8. An analyzer cell for on-stream measurements of a continuously flowing viscous fluid stream comprising:
    a. a body member adapted to be operably connected in said flowing stream and having
        1. a first passageway for carrying said flowing stream through said body member and
        2. a second passageway smaller in cross-section than said first passageway intersecting said first passageway in substantially perpendicular relationship;
    b. a plunger means slidably mounted within said second passageway for movement between a retracted and extended position and having mounted thereon at one end and disposed adjacent to said first passageway a first transparent window disposed at one side of said first passageway when retracted and parallel to the direction of flow through said first passageway;
    c. a second transparent window disposed within said second passageway on the opposite side of said first passageway in aligned relationship with said first window, whereby said first window can be located in predetermined close proximity to said second window for confining a sample of said flowing fluid therebetween for analysis and permitting the remainder of said flowing stream to flow through the unoccupied area of said first passageway.

* * * * *